US009495806B2

(12) United States Patent
Nguyen et al.

(10) Patent No.: US 9,495,806 B2
(45) Date of Patent: Nov. 15, 2016

(54) IMAGE PROCESSING APPARATUS AND IMAGE PROCESSING METHOD

(71) Applicant: Panasonic Corporation, Osaka (JP)

(72) Inventors: Khang Nguyen, Osaka (JP); Yusuke Monobe, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 314 days.

(21) Appl. No.: 14/115,647

(22) PCT Filed: Feb. 28, 2013

(86) PCT No.: PCT/JP2013/001216
§ 371 (c)(1),
(2) Date: Nov. 5, 2013

(87) PCT Pub. No.: WO2013/145554
PCT Pub. Date: Oct. 3, 2013

(65) Prior Publication Data
US 2014/0093159 A1    Apr. 3, 2014

(30) Foreign Application Priority Data

Mar. 29, 2012  (JP) ................................ 2012-078066

(51) Int. Cl.
*G06K 9/00*     (2006.01)
*G06T 19/20*    (2011.01)
(Continued)

(52) U.S. Cl.
CPC ................. *G06T 19/20* (2013.01); *G06K 9/46* (2013.01); *G06T 5/001* (2013.01); *G06T 5/002* (2013.01);
(Continued)

(58) Field of Classification Search
CPC ..................... G06T 5/002; G06T 19/20; G06T 5/001; H04N 13/028; H04N 13/0011; G06K 9/46
See application file for complete search history.

(56) References Cited

U.S. PATENT DOCUMENTS 6,163,337 A      12/2000  Azuma et al.
7,340,104 B2 *   3/2008   Fukuda ................... G06T 5/008
                                                        382/254
(Continued)

FOREIGN PATENT DOCUMENTS

JP    2001-359119    12/2001
JP    2004-048725     2/2004
(Continued)

OTHER PUBLICATIONS

International Search Report issued May 21, 2013 in International (PCT) Application No. PCT/JP2013/001216.

*Primary Examiner* — Gregory M Desire
(74) *Attorney, Agent, or Firm* — Wenderoth, Lind & Ponack, L.L.P.

(57) ABSTRACT

An image processing apparatus is provided which includes: a feature calculation unit which calculates feature quantities of respective pixels included in an input image; a reliability level obtaining unit which obtains reliability level information indicating reliability levels of respective depth values indicating depths of the respective pixels; and a depth correction unit which corrects the depth values included in input depth information, using the reliability levels and the feature quantities, to generate output depth information.

19 Claims, 17 Drawing Sheets

(51) Int. Cl.
    *G06K 9/46*     (2006.01)
    *G06T 5/00*     (2006.01)
    *H04N 13/00*    (2006.01)
(52) U.S. Cl.
    CPC . *H04N 13/0011* (2013.01); *G06T 2207/10028* (2013.01)

(56)              References Cited

U.S. PATENT DOCUMENTS

| | | | |
|---|---|---|---|
| 8,761,492 B2* | 6/2014 | Hirai | G06T 5/002 |
| | | | 362/103 |
| 2007/0211227 A1* | 9/2007 | Era | G02B 27/2271 |
| | | | 353/99 |
| 2010/0309201 A1* | 12/2010 | Lim | G06T 5/002 |
| | | | 345/419 |
| 2011/0050853 A1 | 3/2011 | Zhang et al. | |
| 2011/0242339 A1* | 10/2011 | Ogawa | G06T 7/2086 |
| | | | 348/208.4 |
| 2012/0007964 A1 | 1/2012 | Morisada et al. | |
| 2012/0069009 A1* | 3/2012 | Shimoyama | H04N 13/026 |
| | | | 345/419 |
| 2012/0163701 A1* | 6/2012 | Gomi | H04N 13/026 |
| | | | 382/154 |
| 2013/0215107 A1* | 8/2013 | Kimura | G06T 15/00 |
| | | | 345/419 |
| 2014/0093159 A1* | 4/2014 | Nguyen | G06T 5/002 |
| | | | 382/154 |
| 2014/0347443 A1* | 11/2014 | Cohen | G01B 11/22 |
| | | | 348/46 |

FOREIGN PATENT DOCUMENTS

| | | |
|---|---|---|
| JP | 2011-511532 | 4/2011 |
| JP | 2012-019365 | 1/2012 |
| WO | 2011/033673 | 3/2011 |

* cited by examiner

122

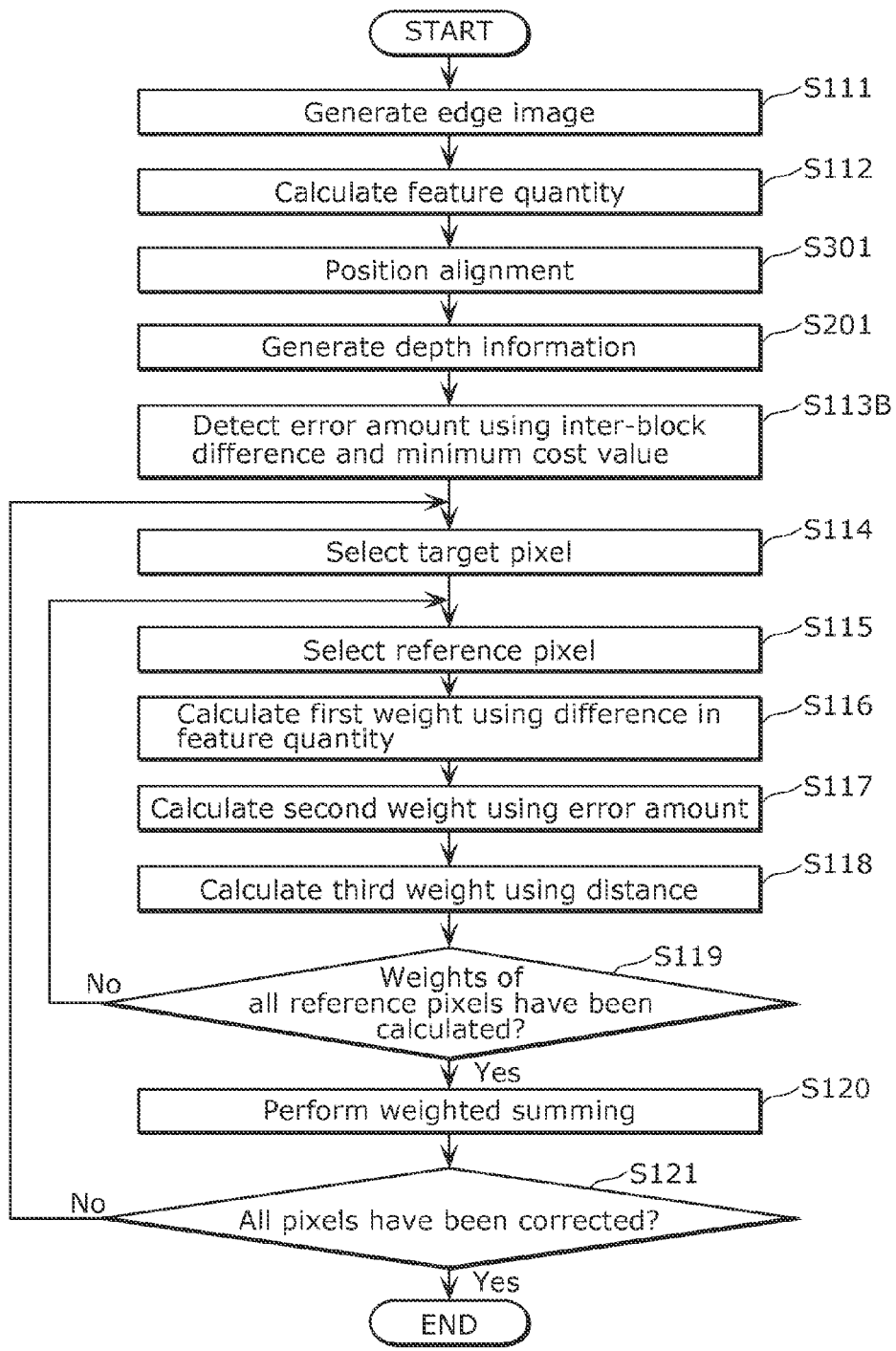

IMAGE PROCESSING APPARATUS AND IMAGE PROCESSING METHOD

TECHNICAL FIELD

The present invention relates to an image processing apparatus and an image processing method for correcting depth values.

BACKGROUND ART

A technique has been known in which, per pixel or certain area in an input image, a depth value of the pixel or the certain area is estimated. An example of a depth value is a distance from an imaging apparatus to an object. However, in processing using such a technique, errors are caused in the depth estimation due to the feature of the image or noise which lowers the accuracy in detection, in some cases. Therefore, the image quality of the output image is degraded through the image processing using the depth values generated by the conventional depth estimation technique. For example, depth image based rendering (DIBR), in which a parallax image is generated by shifting the image based on the depth values, has a problem in that the generated image includes noise or distorted object caused by the errors in depth values. Furthermore, in processing for arbitrarily adjusting blurs in the image using the depth values, the anteroposterior relationship of the object cannot be maintained because of the depth value errors. The above problem causes another problem of unnatural blurs of the object in the generated image.

As described above, depth values with high-accuracy are required to improve the quality of the output image generated through imaging processing using depth values. However, as it has been described, there is a limit in the accuracy of the depth value estimation processing using an image and the estimated depth values include a lot of errors. In view of this, a technique for correcting the estimated depth values has been developed.

As a conventional depth value correction technique, a technique has been known in which depth values are corrected using a relationship between respective pixel values corresponding to a target pixel and a peripheral pixel (for example, see Patent Literature (PTL) 1). The apparatus disclosed in PTL 1 calculates a weight of a peripheral depth value using a pixel value (color, luminance, or chromaticity) of the input image, and corrects the depth value using the weight. In other words, the apparatus determines pixels having approximate pixel values as the same object and corrects the depth values of the pixels.

CITATION LIST

Patent Literature

[PTL 1] WO 2011/033673

SUMMARY OF INVENTION

Technical Problem

In such an image processing apparatus for depth value correction, it is desired to improve the accuracy of the depth values.

Therefore, the present invention has an object to provide an image processing apparatus which can improve the accuracy of depth values.

Solution to Problem

In order to solve the above problems, an image processing apparatus according to an aspect of the present invention is an image processing apparatus which corrects depth values indicating depths of pixels included in an input image, the apparatus including: a feature calculation unit configured to calculate feature quantities of the respective pixels; a reliability level obtaining unit configured to obtain reliability levels of the respective depth values; and a depth correction unit configured to correct the depth values using the reliability levels and the feature quantities.

It is to be noted that general or specific aspects of the above may be realized by a system, a method, an integrated circuit, a computer program, or a computer-readable recording medium such as a CD-ROM, and an arbitrary combination of a system, a method, an integrated circuit, a computer program, and a recording medium.

Advantageous Effects of Invention

The present invention provides an image processing apparatus which can improve the accuracy of depth values.

BRIEF DESCRIPTION OF DRAWINGS

FIG. 20 is a flowchart of an image processing method according to Embodiment 3.

DESCRIPTION OF EMBODIMENTS

Figure 1:
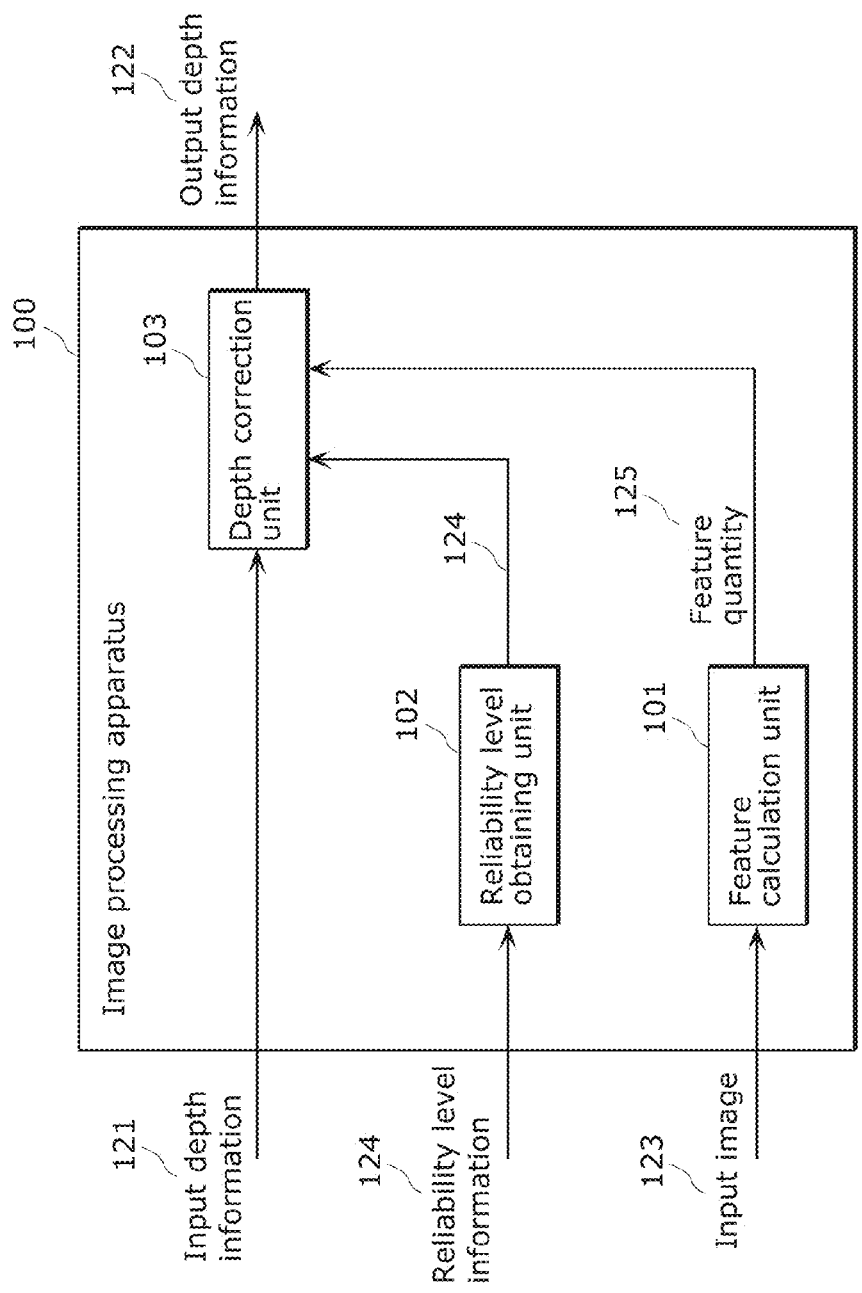
FIG. 1 is a block diagram showing a configuration of an image processing apparatus according to Embodiment 1.

[Underlying Knowledge Forming Basis of the Present Disclosure]

The inventors have found that the conventional technique has the following problems.

For example, the conventional apparatus disclosed in PTL 1 determines different objects in similar colors as the same object, and corrects the depth values using the erroneous peripheral depth values in some cases. This lowers the accuracy of the corrected depth values, according to the inventors.

Furthermore, in a natural image, a same object includes many parts in different colors. In such a case, the conventional apparatus determines the parts in different colors as different objects even though they are of the same object. Thus, even when the peripheral depth values are correct, the correct depth values are not used for correction and the depth value of the target pixel is not corrected. As a result, the depth values cannot be corrected through the conventional processing and the accuracy of depth values cannot be improved, according to the inventors.

In order to solve the above problems, an image processing apparatus according to an aspect of the present invention is an image processing apparatus which corrects depth values indicating depths of pixels included in an input image, the apparatus including: a feature calculation unit configured to calculate feature quantities of the respective pixels; a reliability level obtaining unit configured to obtain reliability levels of the respective depth values; and a depth correction unit configured to correct the depth values using the reliability levels and the feature quantities.

With this, the image processing apparatus can determine the correctness of the depth value of the target pixel and the depth values of the peripheral image using the reliability levels for example, and thus the depth value of the target pixel can be corrected using the correct peripheral depth value. Pixels having the same feature are likely to be the same object, that is, likely to have the same depth value. Therefore, the image processing apparatus can distinguish a peripheral pixel included in the object same as the target pixel using the feature quantity of the pixel, for example. With this, the image processing apparatus can improve the accuracy of the depth values.

For example, the depth correction unit may be configured to correct a depth value of a target pixel to be processed, by preferentially using a depth value whose reliability level is high and a depth value whose feature quantity is close to a feature quantity of the depth value of the target pixel, among depth values of reference pixels included in the pixels.

With this, the image processing apparatus can correct the depth value of the target pixel using the depth value having a high reliability level. Furthermore, the image processing apparatus can distinguish a peripheral pixel included in the object same as the target pixel. With this, the image processing apparatus can improve the accuracy of the depth values.

For example, the depth correction unit may include: a weight calculation unit configured to calculate weights of the respective reference pixels using the feature quantities and the reliability levels of the respective reference pixels; and a depth synthesizing unit configured to generate the depth value of the corrected target pixel by weighted averaging the depth values of the reference pixels using the weights calculated.

With this, the image processing apparatus calculates the weights based on the reliability levels of the respective reference pixels. Specifically, the weights differ according to correctness levels of the depth values of the reference pixels, and thus the correction accuracy of the depth values is improved. Furthermore, the image processing apparatus calculates the weight based on the feature quantity of the pixel. In this way, the image processing apparatus can use the depth value of the pixel having the feature similar to that of the target pixel, and thus can improve the accuracy of the depth values.

For example, the weight calculation unit may: calculate differences between the feature quantity of the target pixel and the feature quantities of the respective reference pixels; and reduce the weight of a corresponding one of the reference pixels as the difference increases.

With this, the weight of the depth value of the reference pixel having a feature closer to the target pixel is increased. Therefore, the image processing apparatus can use more depth values of the pixels having the similar features, and thus can improve the accuracy of the depth values.

For example, the feature quantities may include edge strengths of the respective pixels.

With this, the image processing apparatus can calculate the feature quantity of the target pixel and the feature quantities of the reference pixels. The edge is detected at a border between the objects in general. Furthermore, different objects are likely to have different depth values. Therefore, this image processing apparatus distinguishes a reference pixel included in the object same as the target pixel by using an edge amount, and uses the depth value of the reference pixel. With this, the image processing apparatus can improve the accuracy of the depth values.

For example, the feature quantities may include edge directions of the respective pixels.

With this, the image processing apparatus can correct the depth value using the edge direction of the pixel. With this, the image processing apparatus can improve the accuracy of the depth values.

For example, the weight calculation unit may be configured to increase the weight of a corresponding one of the reference pixels as the reliability level of the reference pixel increases.

With this, the image processing apparatus can reduce the weight of the depth value having a low reliability level, thereby reducing the effect of the pixels including errors. Furthermore, the image processing apparatus can increase the weight of the depth value having a high reliability level, thereby improving the accuracy of the corrected depth values.

For example, the weight calculation unit may be configured to reduce the weight of a corresponding one of the reference pixels as a distance of the reference pixel from the target pixel increases.

Here, the pixel having a greater distance from the target pixel is likely to be included in an object different from the target pixel. Specifically, the pixel having a greater distance from the target pixel is likely to have a depth value different than the target pixel. Therefore, the image processing apparatus reduces the weight of the depth value of the pixel having a greater distance from the target pixel, thereby reducing the effect of the depth values of the different objects.

For example, the reliability level may indicate one of correctness levels of the respective depth values and whether or not the respective depth values are correct.

With this, the image processing apparatus can grab the correctness levels of the depth values. Therefore, the image processing apparatus can allocate correct peripheral depth values more and erroneous peripheral depth values less for the depth value of the target pixel when correcting the depth value of the target pixel. With this, the image processing apparatus can improve the accuracy of the corrected depth values.

For example, the image processing apparatus may further include a depth estimation unit configured to estimate the depth values using a plurality of images including the input image.

With this, the image processing apparatus can estimate the depth values from a plurality of images.

For example, the depth estimation unit may be configured to: calculate, for the respective pixels, cost values indicating matching levels between (i) a blur amount of a target pixel to be processed and (ii) a plurality of predetermined blur amounts that corresponds to a plurality of predetermined depths, the cost values being calculated for the respective depth values; and estimate, as the depth value of the target pixel, a depth value that corresponds to a selected cost value that indicates a highest matching level among the calculated cost values, and the reliability level obtaining unit may be configured to calculate the reliability level using the selected cost value.

With this, the image processing apparatus can calculate the reliability levels of the depth values having high accuracy using the information used in the depth value estimation processing.

For example, the reliability level obtaining unit may be configured to increase the reliability level as the matching level indicated by the selected cost value increases.

Here, the depth value is likely to be correct as the matching level indicated by the selected cost value increases. Therefore, the image processing apparatus can calculate the reliability levels of the depth values having high accuracy.

For example, the reliability level obtaining unit may further set the reliability level to a lowest value when the matching level indicated by the selected cost value is smaller than a threshold.

With this, the image processing apparatus can reduce the effect of the depth values having low reliability levels.

For example, the reliability level obtaining unit may be further configured to change the threshold according to a luminance value of the target pixel.

Here, the cost values tend to vary depending on the luminance values. Therefore, the image processing apparatus changes the threshold according to the luminance values to reduce the effect of the variance in the cost values depending on the luminance values, for example.

For example, the reliability level obtaining unit may be configured to increase the threshold as the luminance value is greater.

With this, the image processing apparatus can reduce the effect of the variance in the cost values depending on the luminance values.

For example, the image processing apparatus may further include a position alignment unit configured to move a position of an object to align the position of the object in the images, wherein the depth estimation unit may be configured to estimate the depth values using the images on which the position alignment has been performed, and the reliability level obtaining unit may be configured to calculate the reliability level using information generated in the position alignment.

With this, the image processing apparatus can improve the accuracy of the depth values by aligning the position of the object in the input images. Furthermore, the image processing apparatus can improve the accuracy of the reliability levels by using the information generated in the position alignment.

For example, in the position alignment, the position alignment unit may be configured to: calculate differences between a target block included in a target image which is one of the images and a plurality of blocks included in an image different from the target image among the images; and determine a block that has a smallest difference among the calculated differences as a corresponding block that corresponds to the target block, and the reliability level obtaining unit may be configured to increase the reliability level as the difference between the target block and the corresponding block is smaller.

Here, the corresponding block having a smaller difference from the target block is likely to have a correct depth value. Therefore, the image processing apparatus can improve the accuracy of the reliability levels.

It is to be noted that general or specific aspects of the above may be realized by a system, a method, an integrated circuit, a computer program, or a computer-readable recording medium such as a CD-ROM, and an arbitrary combination of a system, a method, an integrated circuit, a computer program, and a recording medium.

Embodiments according to the present invention are described below with reference to the Drawings.

It is to be noted that each of the embodiments described below is a specific example of the present invention. The numerical values, shapes, constituent elements, the arrangement and connection of the constituent elements, steps, the processing order of the steps etc. shown in the following embodiments are mere examples, and thus do not limit the present disclosure. Furthermore, out of the constituents in the following embodiments, the constituents not stated in the independent claims describing the broadest concept of the present invention are described as optional constituents.

[Embodiment 1]

With an image processing apparatus according to the present embodiment, input depth information is corrected based on feature quantities of the input image and reliability levels of the input depth information. With this, the image processing apparatus can improve the accuracy of the depth values.

First, description is provided on a basic configuration of the image processing apparatus according to the present embodiment. FIG. 1 is a block diagram showing a basic structure of an image processing apparatus 100 according to the present embodiment.

The image processing apparatus 100 shown in FIG. 1 generates output depth information 122 by correcting input depth information 121. The input depth information 121 includes a plurality of depth values indicating depths of a plurality of pixels included in an input image 123.

The image processing apparatus 100 includes a feature calculation unit 101, a reliability level obtaining unit 102, and a depth correction unit 103.

The feature calculation unit 101 calculates feature quantities 125 of the respective pixels included in the input image 123.

The reliability level obtaining unit 102 obtains reliability level information 124. The reliability level information 124 is information indicating the reliability levels of the respective depth values included in the input depth information 121. Here, the reliability level is information indicating accuracy level of the corresponding depth value. Specifically, the reliability level indicates one of correctness levels of the respective depth values and whether or not the respective depth values are correct.

The depth correction unit 103 generates the output depth information 122 by correcting the input depth information 121 using the reliability level information 124 and the plurality of feature quantities 125.

Figure 2:
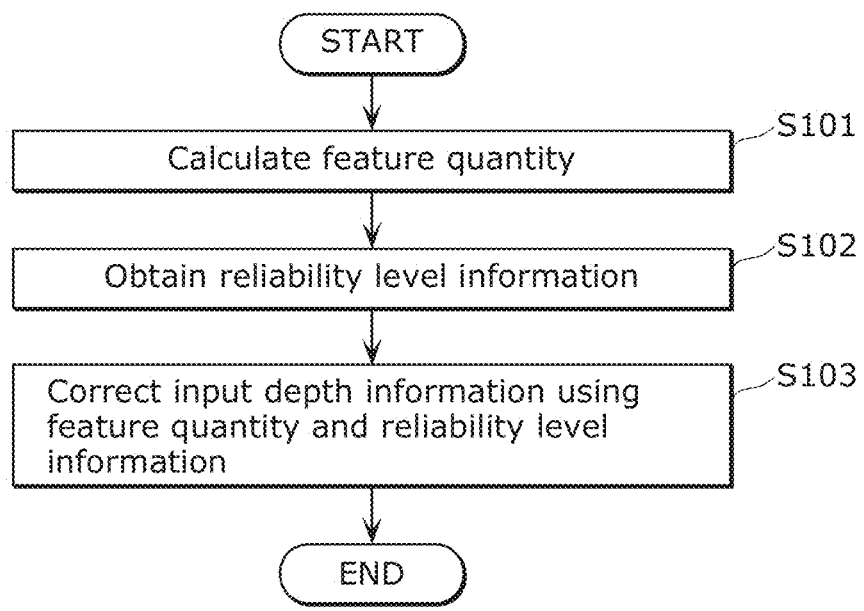
FIG. 2 is a flowchart of an image processing method according to Embodiment 1.

FIG. 2 is a flowchart showing a basic operation performed by the image processing apparatus 100 according to the present embodiment.

First, the feature calculation unit 101 calculates the feature quantities 125 of the respective pixels included in the input image 123 (S101). Next, the reliability level obtaining unit 102 obtains reliability level information 124 (S102).

Next, the depth correction unit 103 generates the output depth information 122 by correcting the input depth information 121 using the reliability level information 124 and the feature quantities 125 (S103). Specifically, the depth correction unit 103 corrects the depth value of the target pixel using the depth value of the reference pixel included in the input image 123. The reference pixel is a pixel in the periphery of the target pixel, for example.

More specifically, the depth correction unit 103 corrects the depth value of the target pixel, by preferentially using a depth value whose reliability level is high and a depth value whose feature quantity is close to a feature quantity of the depth value of the target pixel, among the depth values of the reference pixels included in the input image 123.

In this way, the image processing apparatus 100 according to the present embodiment corrects the input depth information 121 based on the feature quantities of the input image 123 and the reliability levels of the input depth information 121. Thus, the image processing apparatus 100 can determine the correctness of the depth value of the target pixel and the depth values of the peripheral image using the reliability levels for example, and thus the depth value of the target pixel can be corrected using the correct peripheral depth values. Pixels having the same feature are likely to be the same object, that is, likely to have the same depth value. Therefore, the image processing apparatus 100 can distinguish a peripheral pixel included in the object same as the target pixel. With this, the image processing apparatus 100 can improve the accuracy of the depth values.

The following describes the detailed configuration and operation of the image processing apparatus 100 according to the present embodiment.

Figure 3:
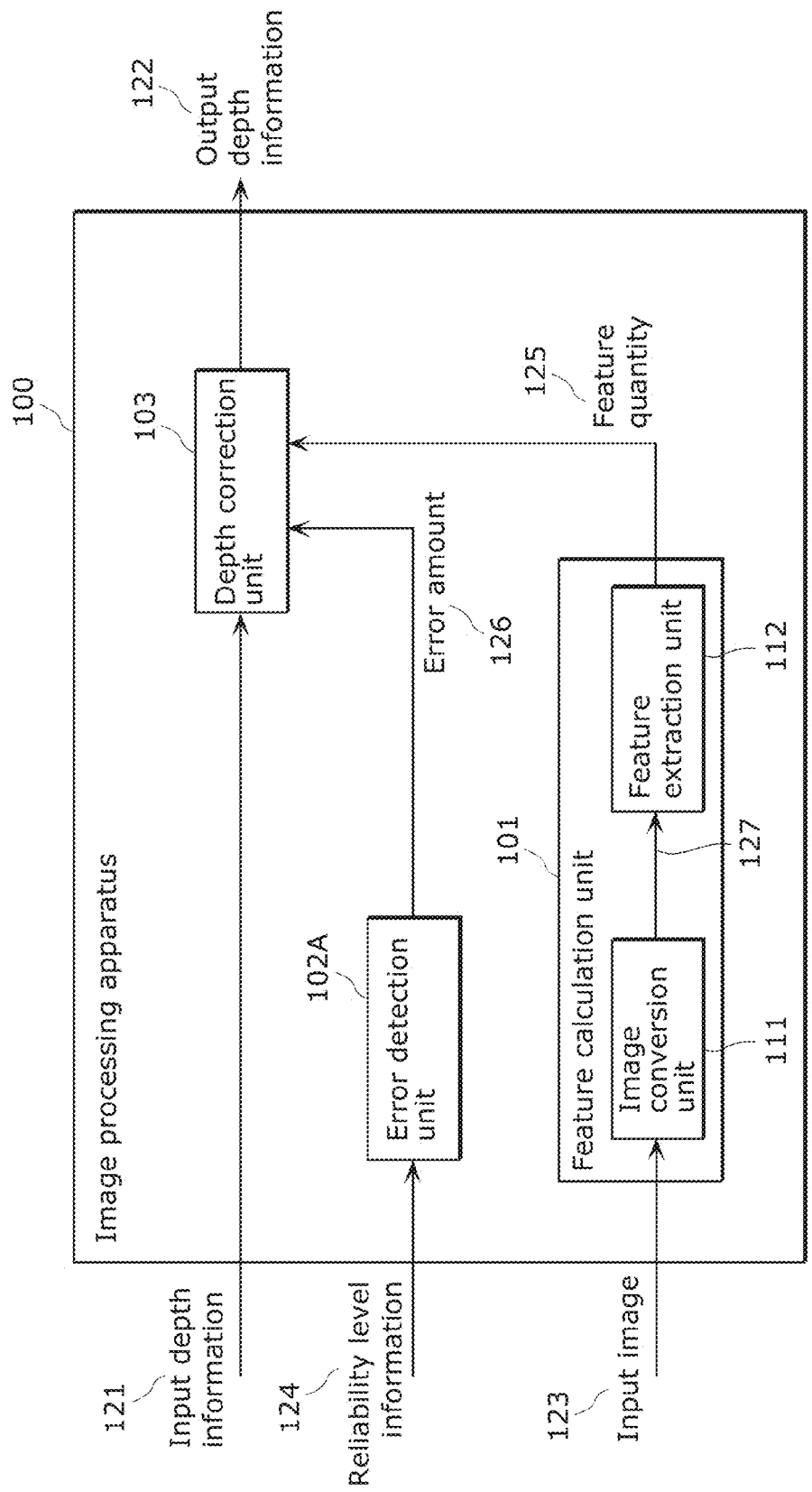
FIG. 3 is a block diagram showing a configuration of the image processing apparatus according to Embodiment 1.

First, description is provided on the configuration of the image processing apparatus 100 according to the present embodiment. FIG. 3 is a block diagram showing a functional configuration of the image processing apparatus 100 according to the present embodiment. As shown in FIG. 3, the image processing apparatus 100 includes a feature calculation unit 101, an error detection unit 102A, and a depth correction unit 103.

Figure 4:
FIG. 4 shows an example of an input image according to Embodiment 1.

The following describes the operation performed by each processing unit of the image processing apparatus 100 according to the present embodiment. FIG. 4 shows an example of an input image 123 which is an original image.

The error detection unit 102A corresponds to the reliability level obtaining unit 102 shown in FIG. 1, and has a function to calculate error amounts 126 of the input depth information 121 based on the reliability level information 124, in addition to the function of the reliability level obtaining unit 102. An example is described below in which the error detection unit 102A converts the reliability level into the error amount 126 and performs the subsequent processing using the error amount 126. However, as shown in FIG. 1, the conversion does not have to be performed and the reliability level may be used as it is in the subsequent processing.

Figure 5:
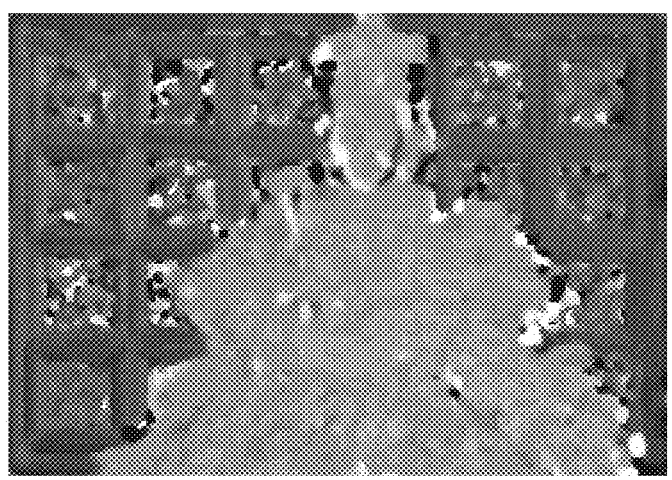
FIG. 5 shows an example of input depth information according to Embodiment 1.

FIG. 5 shows an input depth image which is an example of the input depth information 121. This input depth information 121 is an image generated through depth estimation processing on the input image 123 shown in FIG. 4 performed by the image processing apparatus 100 or another apparatus, for example. It is sufficient that the input depth information 121 is information indicating the depth value of the pixel, and a scheme for generating the information is not limited to the above.

In the input depth information 121 shown in FIG. 5, a pixel estimated as being more forward-positioned is displayed whiter and a pixel estimated as being more backward-positioned is displayed blacker, according to the estimated depth value of the pixel. It can be understood from FIG. 5 that the input depth information 121 includes a lot of errors. The errors are caused by capturing conditions, low accuracy of image matching in the depth estimation, and so on. Here, the cause of the errors in the input depth information 121 is not identified and it is assumed that the input depth information 121 includes errors due to any reason.

Figure 6:
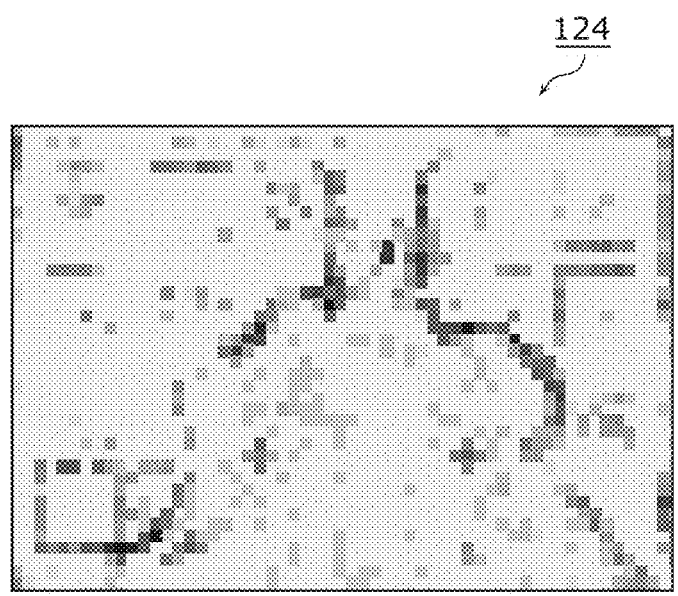
FIG. 6 shows an example of reliability level information according to Embodiment 1.

FIG. 6 shows a reliability level image which is an example of the reliability level information 124. For example, this reliability level information 124 is an image indicating the accuracy levels of the depth values obtained when the depth estimation is performed on the input image 123 shown in FIG. 4. Specifically, the reliability level information 124 indicates the correctness levels of the estimated depth values for the respective pixels or areas included in the input image 123. Here, the reliability level information 124 may be generated by any scheme, specifically; the reliability level information 124 may be (i) obtained in the depth estimation as described above and (ii) calculated based on other conditions.

Figure 7:
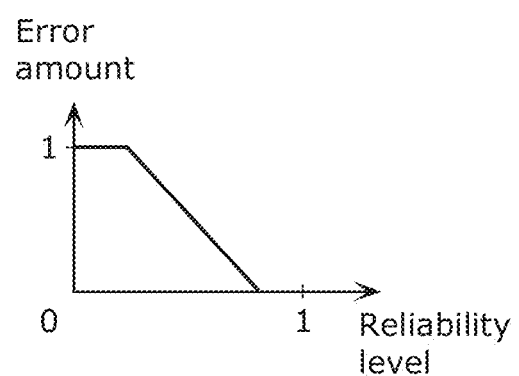
FIG. 7 shows a relationship between the reliability level and an error amount according to Embodiment 1.

The error detection unit 102A calculates a plurality of error amounts 126 of the input depth information 121 based on the reliability level information 124. Furthermore, the respective error amounts 126 correspond to the respective depth values included in the input depth information 121. FIG. 7 shows a relationship between the reliability level indicated in the reliability level information 124 and the error amount 126. As shown in FIG. 7, the error detection unit 102A reduces the error amount as the reliability level increases, for example. In this way, the error detection unit 102A can estimate the error amounts 126 indicating the amounts of errors (incorrectness levels) of the respective depth values in the input depth information 121.

Although the error detection unit 102A performs conversion as shown in FIG. 7 when converting the reliability level into the error amount in the present embodiment, the conversion is not limited to the above and any scheme may be used as long as the error amount is reduced as the reliability level increases.

The feature calculation unit 101 includes an image conversion unit 111 and a feature extraction unit 112.

The image conversion unit 111 converts the input image 123 shown in FIG. 4 into a feature image using information on the respective pixel values included in the input image 123. Here, the image conversion unit 111 generates an edge image 127 by performing edge detection processing on the input image 123, for example.

Figure 8:
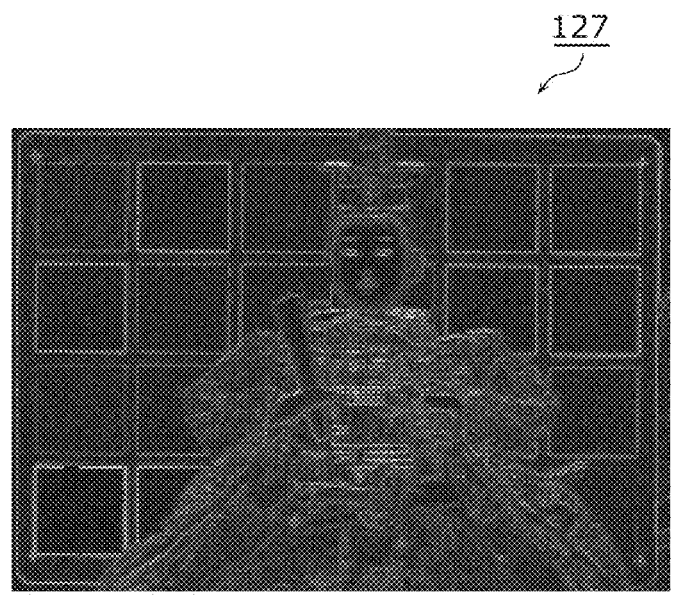
FIG. 8 shows an example of an edge image according to Embodiment 1.

FIG. 8 shows an example of the edge image 127. In a general image, the edge is often detected in the periphery of the contour of the object. Therefore, it is likely that different objects are present in the periphery of the edge. Specifically, it is likely that the depth values are different in the periphery of the edge. Therefore, when the depth value of the target pixel is corrected simply using peripheral depth values, the depth value of the target pixel is corrected using the depth values of the different object in some cases. in this case, the depth value cannot be corrected appropriately. Therefore, the image processing apparatus 100 according to the present embodiment corrects depth values using the feature of the edge of the image.

Furthermore, the image conversion unit 111 uses, for example, Sobel filter to convert the input image 123 into the edge image. The image conversion unit 111 may use another scheme. For example, the image conversion unit 111 may use another scheme such as Prewitt filter, Laplacian filter, or the like. It is to be noted that the image conversion unit 111 may detect information on color, luminance, or chromaticity of the respective pixels in addition to the edge information, and convert the input image 123 into the feature image using the detected information.

The feature extraction unit 112 calculates the plurality of feature quantities 125 using the edge image 127. Specifically, the feature extraction unit 112 extracts the edge strengths of the respective pixels shown in the edge image 127, as the feature quantities 125. Specifically, in the present embodiment, the feature quantities 125 are the edge strengths of the respective pixels. It is to be noted that the feature extraction unit 112 may calculate the final feature quantities 125 by performing a predetermined arithmetic operation on the feature quantities obtained from the edge strengths. For example, the feature extraction unit 112 may calculate the feature quantities 125 using the information on color, luminance, or chromaticity of the respective pixels, in addition to the edge strengths. Furthermore, the feature extraction unit 112 may calculate the feature quantities 125 using a spatial frequency or a contrast of the input image 123.

The depth correction unit 103 corrects the errors in the input depth information 121 based on the plurality of error amounts 126 and the plurality of feature quantities 125.

Figure 9:
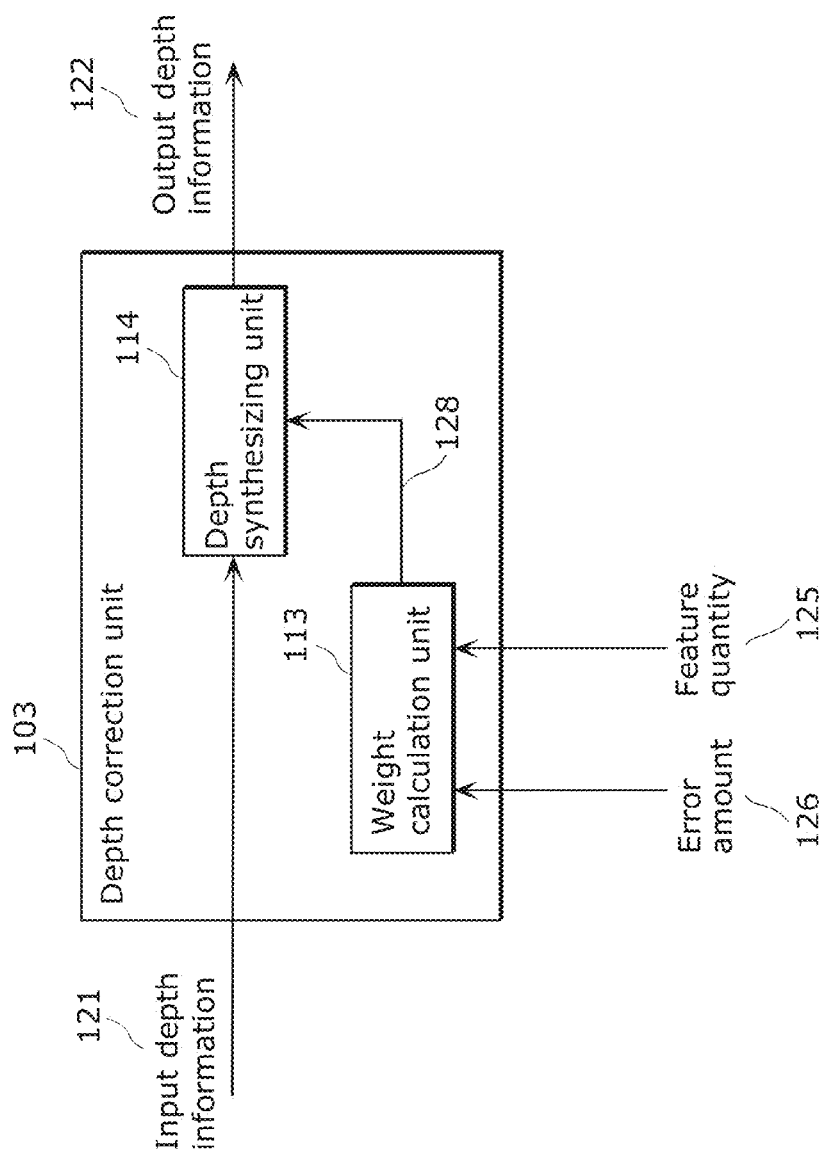
FIG. 9 is a block diagram showing a configuration of a depth correction unit according to Embodiment 1.

FIG. 9 is a block diagram showing a functional configuration of the depth correction unit 103. As shown in FIG. 9, the depth correction unit 103 includes a weight calculation unit 113 and a depth synthesizing unit 114. Here, the depth correction unit 103 corrects the depth value of the target pixel using the depth values of the peripheral pixels of the target pixel. At this time, the depth correction unit 103 calculates weights 128 indicating to what extent the depth values of the peripheral pixels are to be reflected on the depth value of the target pixel, and corrects the depth value of the target pixel using the weights 128. Each configuration is described below.

When the depth correction unit 103 corrects the depth value of the target pixel using the depth values of the plurality of peripheral pixels around the target pixel, the weight calculation unit 113 calculates, for the respective depth values of the peripheral pixels, the weight 128 to be assigned to the depth value. Furthermore, the weight calculation unit 113 calculates the weights of the respective reference pixels using the feature quantities 125 and the reliability levels of the respective reference pixels including the target pixel.

Specifically, the weight calculation unit 113 calculates differences between the feature quantity 125 of the target pixel and the feature quantities 125 of the peripheral pixels first. Specifically, the difference between the feature quantities is a difference between the edge strengths, for example. Here, the weight calculation unit 113 calculates absolute values of the differences. Next, the weight calculation unit 113 calculates the weights 128 using the calculated differences in the feature quantities.

Figure 10A:
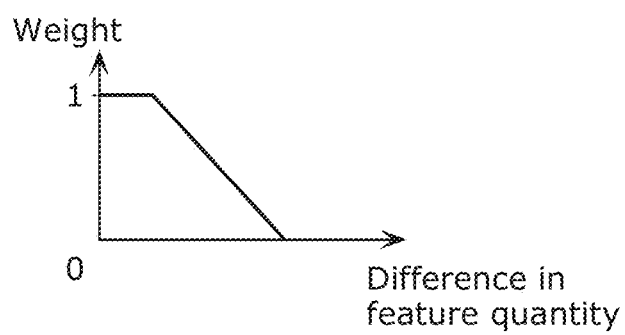
FIG. 10A shows a relationship between a difference in feature quantities and a weight according to Embodiment 1.

FIG. 10A shows a relationship between the differences in the feature quantities and the weights 128. When the feature quantities of two pixels are closer, the two pixels are more likely to be included in the same object. Therefore, the weight 128 is increased as the difference between the feature quantities decreases, as shown in FIG. 10A. Although the weight calculation unit 113 performs conversion as shown in FIG. 10A here, the conversion scheme is not limited. The weight calculation unit 113 may use any other conversion scheme as long as the weight is increased as the difference between the feature quantities decreases.

Figure 10B:
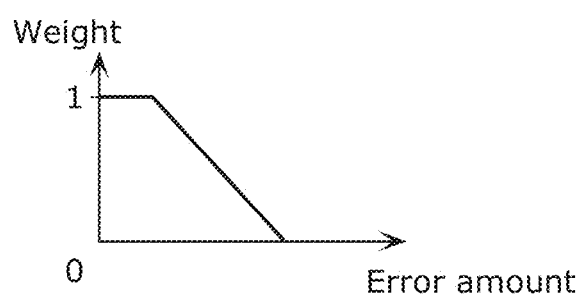
FIG. 10B shows a relationship between the error amount and the weight according to Embodiment 1.

Although the depth correction unit 103 uses the depth values of the peripheral pixels to correct the depth value of the target pixel, the depth values of the peripheral pixels are not correct in some cases. The depth correction unit 103 uses the error amounts 126 in order not to use the incorrect depth values for correction. When the error amount is large, it is likely that the depth values are incorrect. Therefore, the weight calculation unit 113 reduces the weight 128 of the depth value as the error amount increases. FIG. 10B shows a relationship between the error amount 126 and the weight 128. The weight calculation unit 113 reduces the weight 128 as the error amount 126 increases, as shown in FIG. 10B. Specifically, the weight calculation unit 113 increases the weight 128 as the reliability level increases.

Figure 10C:
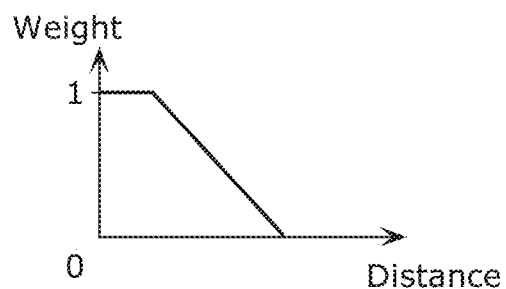
FIG. 10C shows a relationship between a distance and the weight according to Embodiment 1.

Furthermore, a peripheral pixel having a greater distance from the target pixel is more likely to be included in an object different from that of the target pixel. The weight calculation unit 113 may calculate the weight using this feature. FIG. 10C shows a relationship between the distance of the peripheral pixel from the target pixel and the weight 128. The weight calculation unit 113 calculates the distance of the peripheral pixel from the target pixel and reduces the weight as the distance increases. When the weight 128 is calculated using the distance between the pixels as described above, the weight calculation unit 113 may calculate the distance, or the weight calculation unit 113 may calculate the weight 128 using distance information preliminarily calculated by another processing unit.

The depth synthesizing unit 114 corrects the input depth information 121 using the plurality of weights 128 calculated by the weight calculation unit 113. Specifically, the depth synthesizing unit 114 generates the corrected depth value of the target pixel by taking a weighted average on the depth values of the plurality of reference pixels using the plurality of weights 128 calculated. Specifically, when the depth value of the peripheral pixel is represented as D(i), the weight calculated from the feature quantity 125 is represented as Wf(i), the weight calculated from the error amount is represented as We(i), and the weight calculated from the distance is represented as Wd(i), the output depth value D(0) of the target pixel is calculated by Equation (1) below.

[Math 1]

$$D(0) = \frac{\sum_i D(i)Wf(i)We(i)Wd(i)}{\sum_i Wf(i)We(i)Wd(i)} \quad (1)$$

Figure 11:
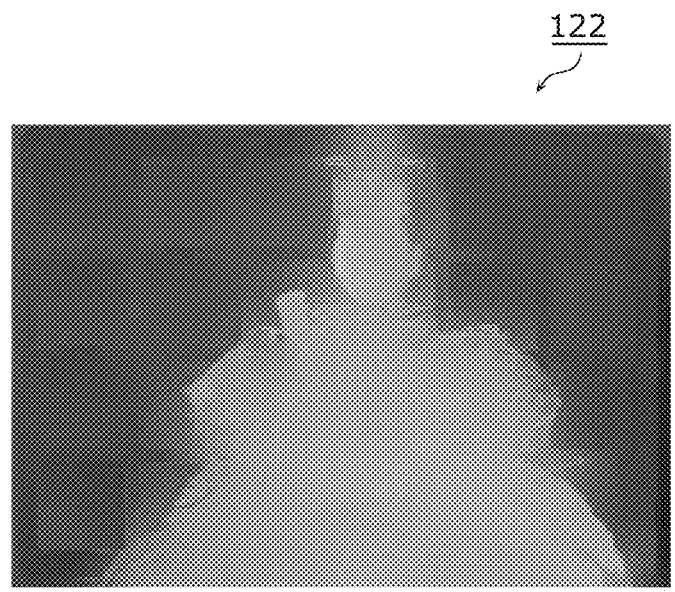
FIG. 11 shows an example of output depth information according to Embodiment 1.

FIG. 11 shows an output depth image which is an example of the output depth information 122 including a plurality of output depth values D(0) calculated by the depth synthesizing unit 114 through the above processing. In the output depth information 122 shown in FIG. 11, the errors have been corrected as compared with the input depth information 121 shown in FIG. 5. Furthermore, it can be understood that, as shown in FIG. 11, only the depth values including errors caused by noise etc. have been corrected without affecting the depth value of the target.

Figure 12:
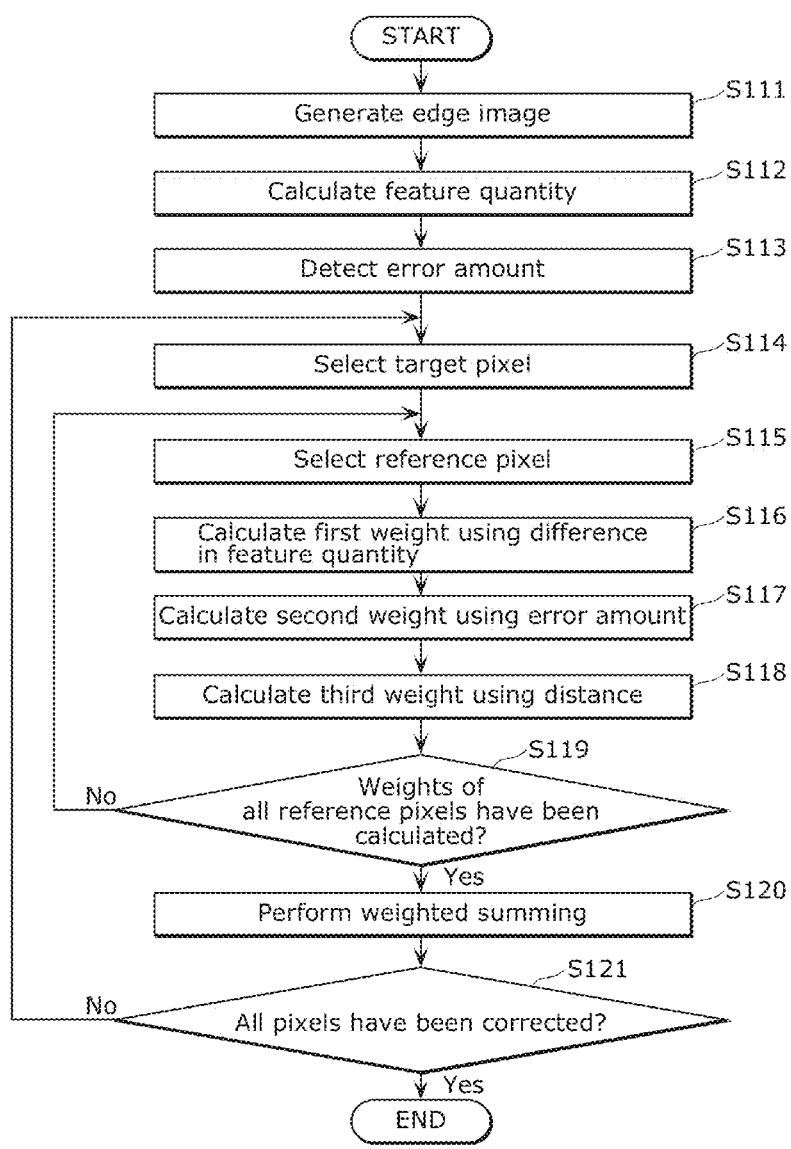
FIG. 12 is a flowchart of the image processing method according to Embodiment 1.

The following describes a flow of processing performed by the image processing apparatus 100. FIG. 12 is a flowchart of an image processing method performed by the image processing apparatus 100.

First, the image conversion unit 111 generates the edge image 127 by extracting the edge of the input image 123 (S111). Next, the feature extraction unit 112 extracts the feature quantities 125 of the respective pixels included in the input image 123 from the edge image 127 (S112).

Furthermore, the error detection unit 102A detects the error amounts of the respective pixels using the reliability level information 124 (S113).

Next, the image processing apparatus 100 selects a target pixel from the plurality of pixels included in the input image 123 (S114). Next, the depth correction unit 103 selects a reference pixel from the plurality of pixels included in the input image 123 (S115). An example of the reference pixel is a pixel in the periphery of the target pixel. Specifically, the reference pixel is a pixel adjacent to the target pixel or a pixel positioned within a predetermined distance from the target pixel. It is to be noted that the plurality of reference pixels may be all the pixels included in the input image 123. Furthermore, the plurality of reference pixels may include the target pixel.

Next, the weight calculation unit 113 calculates a difference between the feature quantity of the target pixel and the feature quantity of the reference pixel, and calculates a first weight using the calculated difference in the feature quantities (S116). Specifically, the weight calculation unit 113 reduces the first weight as the difference in the feature quantities increases.

Furthermore, the weight calculation unit 113 calculates a second weight using the error amount (reliability level) of the reference pixel (S117). Specifically, the weight calculation unit 113 reduces the second weight as the error amount increases (reliability level decreases).

Furthermore, the weight calculation unit 113 calculates a distance of the reference pixel from the target pixel, and calculates a third weight using the calculated distance (S118). Specifically, the weight calculation unit 113 reduces the third weight as the distance increases.

It is to be noted that the steps S116 to S118 may be performed in an arbitrary order, and all or part of these processing may be performed simultaneously.

When the weight calculation processing has not been completed on all the reference pixels (No in S119), the next reference pixel is selected (S115), and the processing of the steps S116 to S118 is performed on the selected reference pixel. Specifically, performance of the steps S115 to S118 on all the reference pixels triggers calculation on the first to third weights corresponding to the respective reference pixels.

When the weight calculation processing is completed on all the reference pixels (Yes in S119), the depth synthesizing unit 114 calculates the corrected depth value of the target pixel by performing weighted summing on the plurality of reference pixels using the first to third weights calculated for the plurality of reference pixels (S120). Specifically, the depth synthesizing unit 114 calculates the corrected depth value of the target pixel by multiplying, for the respective reference pixels, the first to third weights corresponding to the reference pixel, and summing the plurality of products calculated.

With the above processing, the depth value of one target pixel is corrected.

When the correction processing has not been completed on all the pixels included in the input image 123 (No in S121), the next target pixel is selected from the plurality of pixels (S114), and the processing of the steps S115 to S120 is performed on the selected target pixel. Specifically, performance of the steps S114 to S120 on all the pixels triggers correction on the respective depth values of the plurality of pixels.

As described above, the image processing apparatus 100 according to the present embodiment determines the weights of the depth values of the peripheral pixels based on the features (edge strength etc.) and the reliability levels of the image, when correcting the depth value of the target pixel using the depth values of the peripheral pixels. With this, the image processing apparatus 100 can improve the accuracy of the depth values.

Although the image processing apparatus 100 corrects the depth values using all of the first to third weights in the present embodiment, it is not necessary to use all of the weights and some of the weights may be used. In other words, the weight calculation unit 113 may determine the weights 128 using at least one of: the differences between the feature quantity of the target pixel and the feature quantities of the reference pixels, the error amounts of the peripheral pixels, and the distances of the peripheral pixels from the target pixel.

Although the image processing apparatus 100 performs the depth value correction processing on all the pixels in the present embodiment, pixels to be corrected and pixels not to be corrected may be determined using the error amounts and so on. For example, the image processing apparatus 100 may determine a pixel having an error amount larger than a predetermined threshold among the plurality of pixels, and perform error correction processing only on the pixel having the larger error amount than the predetermined threshold.

Although the image processing apparatus 100 uses the edge strength as the feature of the image in the present embodiment, flatness may be used as the feature. In general, the flatness has the opposite meaning to the edge strength, and the flatness decreases as the edge amount increases. In other words, the flatness is also information indicating the edge strength.

Furthermore, the feature extraction unit 112 may extract the edge direction as the feature of the image. In this case, the weight calculation unit 113 calculates differences between the edge direction of the target pixel and the edge directions of the reference pixels, and reduces the weight 128 as the difference increases, for example. With this, the image processing apparatus 100 can correct the target pixel using the reference pixels more similar to the target pixel.

It is to be noted that the weight calculation unit 113 may increase (or reduce) the weight 128 when the edge direction is a predetermined direction (or as the edge direction is closer to the predetermined direction). With this, the weight calculation unit 113 can increase the weight of the depth value having a higher reliability level based on the inclination of the reliability level of the depth value corresponding to the feature of the camera. Specifically, there are cases where a reliability level of a depth value of a pixel having a specific edge direction becomes lower than a reliability level of a depth value of a pixel having another edge direction (for example, an edge direction perpendicular to the above specific edge direction), depending on the feature of the camera (feature of lens, for example). In such a case, the weight calculation unit 113 reduces the weight 128 when the edge direction is a predetermined direction (or as the edge direction is closer to the predetermined direction).

[Embodiment 2]

In the present embodiment, description is provided on a modification of the image processing apparatus 100 according to Embodiment 1 above. An image processing apparatus 200 according to the present embodiment has a function to generate input depth information 121, in addition to the function of the image processing apparatus 100 above. Furthermore, the image processing apparatus 200 calculates the reliability level using the information generated when generating the input depth information 121.

Figure 13:
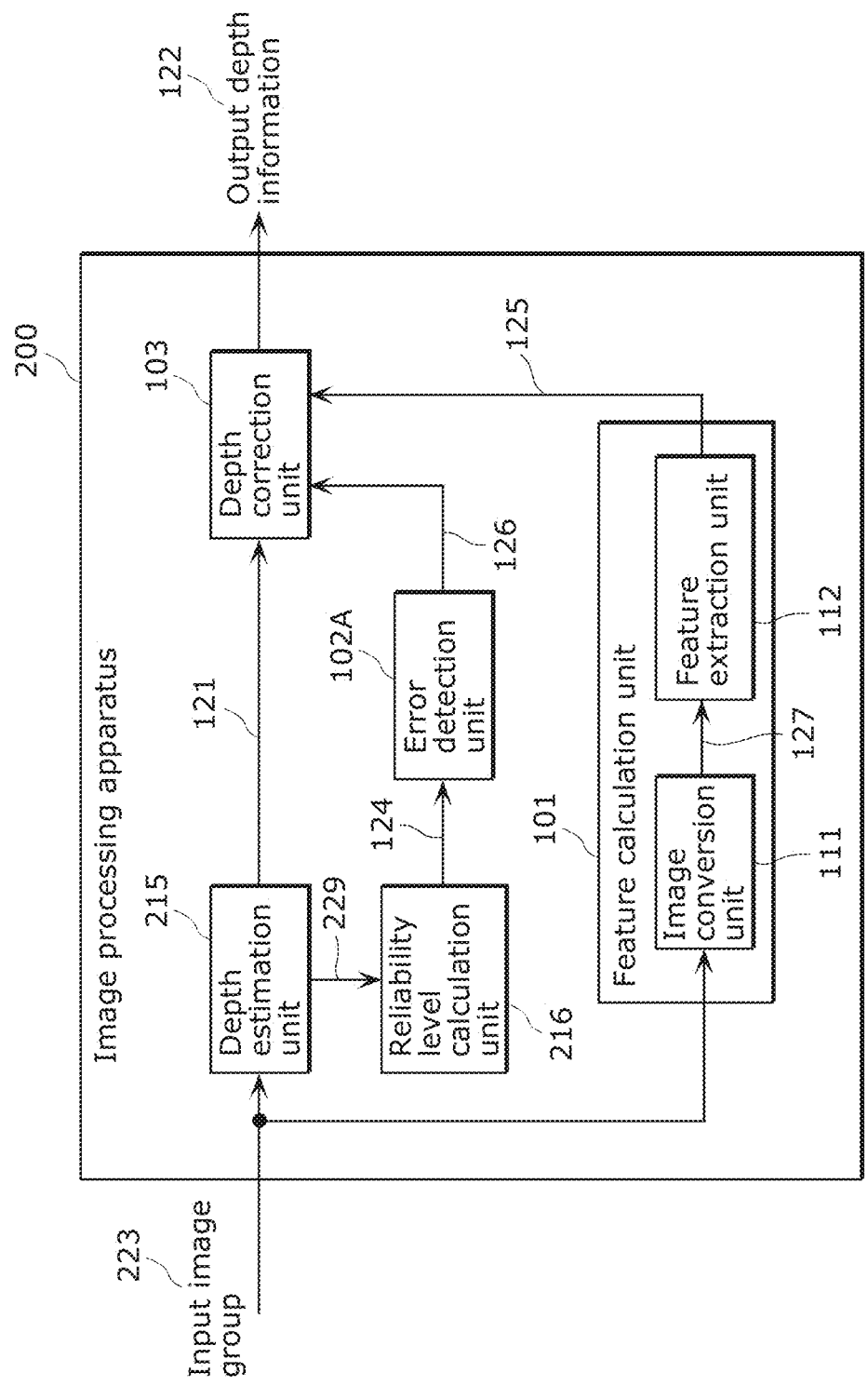
FIG. 13 is a block diagram showing a configuration of an image processing apparatus according to Embodiment 2.

FIG. 13 is a block diagram showing a functional configuration of the image processing apparatus 200 according to the present embodiment. The image processing apparatus 200 includes a depth estimation unit 215 and a reliability level calculation unit 216, in addition to the configuration of the image processing apparatus 100 shown in FIG. 3. It is to be noted that constituent elements same as those in Embodiment 1 are represented by the same numerals, and description is omitted.

The depth estimation unit 215 generates the input depth information 121 by estimating the depth values in the respective pixels using input image group 223 including a plurality of input images. Here, the input image group 223 is a plurality of images including the input image 123 shown in FIG. 3. Typically, the plurality of images included in the input image group 223 is images obtained by capturing the same scene (object) in series or simultaneously to make different focal positions (focusing range).

It is to be noted that an already-known depth estimation processing may be used as the depth estimation processing performed by the depth estimation unit 215. Typically, the depth estimation unit 215 estimates the depth values from a plurality of images. For example, the depth estimation unit 215 uses depth from focus (DFF), depth from defocus (DFD), and so on.

Specifically, the depth estimation unit 215 calculates a plurality of cost values Cost(d(n)) of a plurality of possible depth values d(n) for example, to estimate to which depth value the target pixel corresponds. Here, the respective depth values d(n) correspond to predetermined depths. Specifically, n indicates stages of possible depth values. Furthermore, the cost value Cost(d(n)) indicates a matching degree between the blur amount of the target pixel and a predetermined blur amount corresponding to the depth value d(n). Specifically, a smaller cost value Cost(d(n)) indicates a higher matching degree. Specifically, the depth estimation unit 215 calculates the cost values Cost(d(n)) for the respective depth values d(n).

Next, the depth estimation unit 215 determines a minimum cost value (selected cost value) 229 which is the smallest cost value (the highest matching degree) out of the plurality of cost values Cost(d(n)) calculated, and determines a depth value d(n) corresponding to the minimum cost value 229 as the estimation result of the depth value. Therefore, it can be said that the estimation result is more accurate as the minimum cost value 229 is smaller.

Furthermore, the depth estimation unit 215 performs the above processing per pixel to estimate depth values of the plurality of pixels corresponding to one screen, and outputs the plurality of depth values as the input depth information 121. Furthermore, the depth estimation unit 215 outputs a plurality of minimum cost values 229 corresponding to the one screen.

Figure 14:
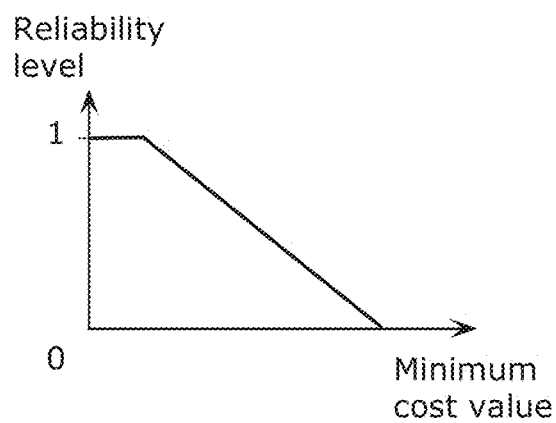
FIG. 14 shows a relationship between a minimum cost value and a reliability level according to Embodiment 2.

The reliability level calculation unit 216 calculates the reliability level information 124 using the plurality of minimum cost values 229. Specifically, the reliability level calculation unit 216 calculates the reliability levels of the estimated depth values based on the respective minimum cost values 229. Specifically, the reliability level calculation unit 216 calculates the reliability level information 124 by converting the minimum cost value 229 in a manner that the reliability level increases as the minimum cost value 229 decreases (as the matching degree increases) as shown in FIG. 14, for example. It is to be noted that the reliability level calculation unit 216 is included in the reliability level obtaining unit 102 shown in FIG. 1, for example.

The error detection unit 102A detects the error amounts 126 using the reliability level information 124 calculated by the reliability level calculation unit 216.

Although an example is described here in which the reliability level calculation unit 216 converts the plurality of minimum cost values (selected cost values) 229 into the reliability level information 124, the error detection unit 102A may use the minimum cost values 229 as they are. For example, the error detection unit 102A may output the minimum cost values 229 as the error amounts 126 as they are. Alternatively, the depth correction unit 103 may calculate the weights 128 using the minimum cost values 229 as they are. Specifically, the depth correction unit 103 may decrease the weight 128 as the minimum cost value 229 increases.

Figure 15:
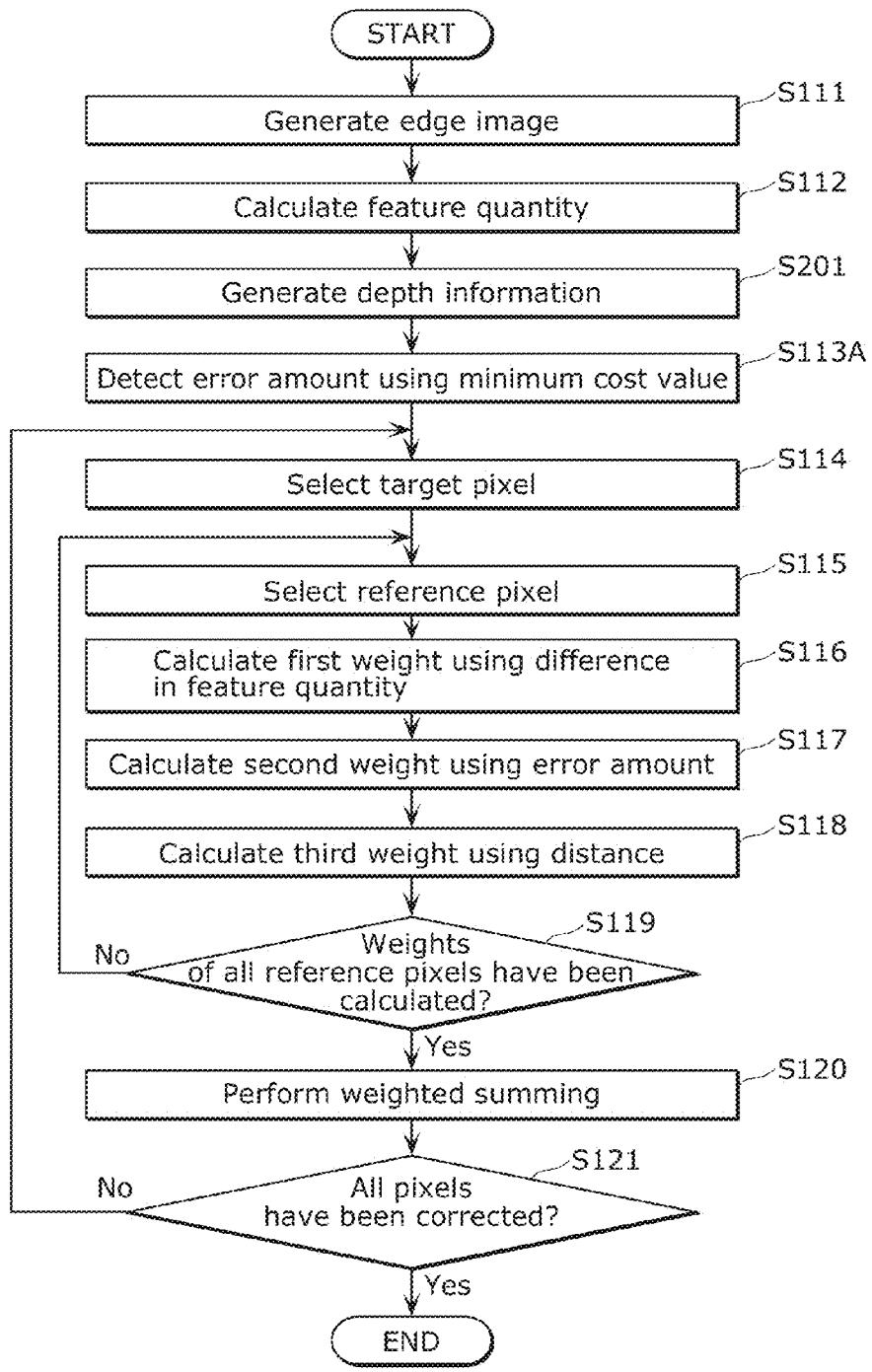
FIG. 15 is a flowchart of an image processing method according to Embodiment 2.

FIG. 15 is a flowchart showing processing performed by the image processing apparatus 200 according to the present embodiment. In the processing shown in FIG. 15, the step S201 is added to the processing shown in FIG. 12. Furthermore, step 113A is different from the step 113.

After the step S112, the depth estimation unit 215 generates the input depth information 121 using the input image group 223 (S201). Next, the reliability level calculation unit 216 calculates the reliability levels using the minimum cost values (selected cost values) 229 calculated in the depth estimation processing, and the error detection unit 102A calculates the error amounts 126 using the reliability levels calculated (S113A). It is to be noted that the subsequent processing is the same as that in Embodiment 1.

As described above, the image processing apparatus 200 according to the present embodiment can calculate the reliability levels using the information used by the depth estimation unit 215 and the reliability level calculation unit 216.

Although the reliability level calculation unit 216 increases the reliability level as the minimum cost value decreases using the minimum cost value used in the depth estimation in the present embodiment, another scheme may be used as long as the reliability level of the depth value is calculated using the minimum cost value used in the depth estimation.

Figure 16:
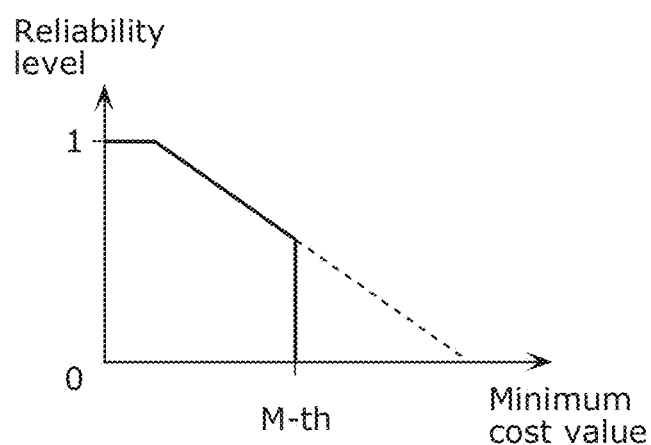
FIG. 16 shows a relationship between the minimum cost value and the reliability level according to Embodiment 2.

For example, when the object is moving at high speed, the position of the object does not match in a plurality of images included in the input image group 223 in some cases. In this case, the depth values cannot be estimated correctly, and therefore the minimum cost values 229 increase. Therefore, the reliability level calculation unit 216 compares the minimum cost value 229 and the threshold M_th, and when the minimum cost value 229 is greater than the threshold M_th (when the matching degree is smaller than the threshold M_th), sets the reliability level to "0", the lowest value, as shown in FIG. 16. This allows reducing the use of depth values having low reliability levels for correction.

Figure 17:
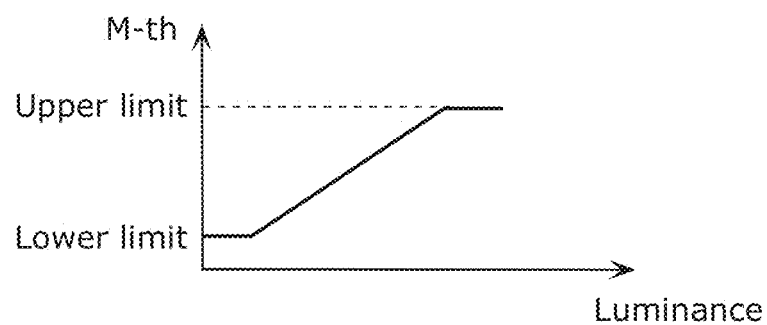
FIG. 17 shows a relationship between a luminance and a threshold according to Embodiment 2.

As shown in FIG. 17, the reliability level calculation unit 216 may change the threshold M_th according to the luminance value of the pixel. Specifically, the reliability level calculation unit 216 increases the threshold M_th as the luminance value increases. Furthermore, one of an upper limit and a lower limit may be set for the threshold M_th. Here, in the calculation of the cost value, the cost value tends to increase as the luminance value increases. Therefore, changing the threshold M_th according to the luminance value reduces the effect of the variance in the cost values according to the luminance values.

[Embodiment 3]

In the present embodiment, description is provided on a modification of the image processing apparatus 200 according to Embodiment 2 above. An image processing apparatus 300 according to the present embodiment has a function to align a position in the input image group 223, in addition to the function of the image processing apparatus 200 above. Furthermore, the image processing apparatus 300 calculates the reliability level using the information generated during the position alignment.

Figure 18:
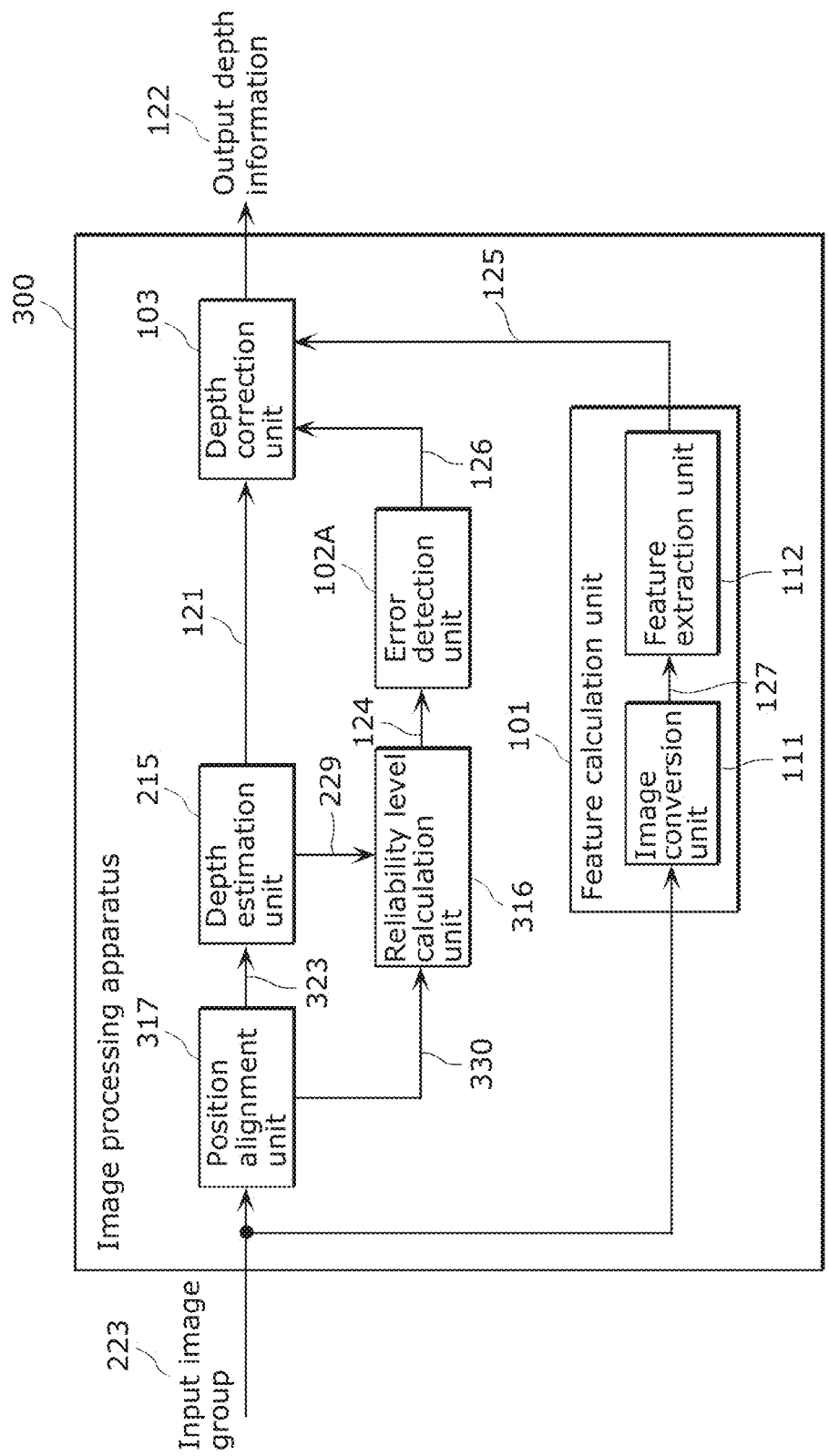
FIG. 18 is a block diagram showing a configuration of an image processing apparatus according to Embodiment 3.

FIG. 18 is a block diagram showing a functional configuration of the image processing apparatus 300 according to the present embodiment. The image processing apparatus 300 includes a position alignment unit 317, in addition to the configuration of the image processing apparatus 200 shown in FIG. 13. Furthermore, the reliability level calculation unit 316 has a function different from that of the reliability level calculation unit 216, it is to be noted that constituent elements same as those in Embodiment 2 are represented by the same numerals, and description is omitted.

When the depth value is estimated using a plurality of images, the position and shape of the object may change depending on time differences between the images. Therefore, the depth values cannot be estimated correctly. Accordingly, the image processing apparatus 300 according to the present embodiment corrects the differences between the positions of the plurality of images and performs depth estimation using the corrected images, to improve the accuracy of the depth estimation. Furthermore, the image processing apparatus 300 uses the information generated in the position alignment to calculate the reliability levels. In this way, the image processing apparatus 300 corrects the depth values appropriately.

The position alignment unit 317 generates an image group 323 by performing position alignment on a plurality of images included in the input image group 223. Specifically, the position alignment unit 317 moves a position of an object to align the position of the object in the plurality of images. It is to be noted that this position alignment processing may be performed using an arbitrary publicly-known processing scheme. For example, the position alignment unit 317 may use a common position alignment scheme including block matching and so on.

Specifically, the position alignment unit 317 searches for a corresponding block in a reference image that corresponds to a target block in a target image, using block matching. The target image and the reference image are images included in the input image group 223. Specifically, the position alignment unit 317 calculates differences between the target block and the respective blocks included in the reference image. Next, the position alignment unit 317 determines, as the corresponding block, a block corresponding to a smallest difference out of the plurality of differences calculated. The position alignment unit 317 moves the target block or the corresponding block, to match the position of the target block and the position of the corresponding block. It is to be noted that the position alignment unit 317 may output position information indicating the blocks corresponding to each other to the depth estimation unit 215.

Figure 19:
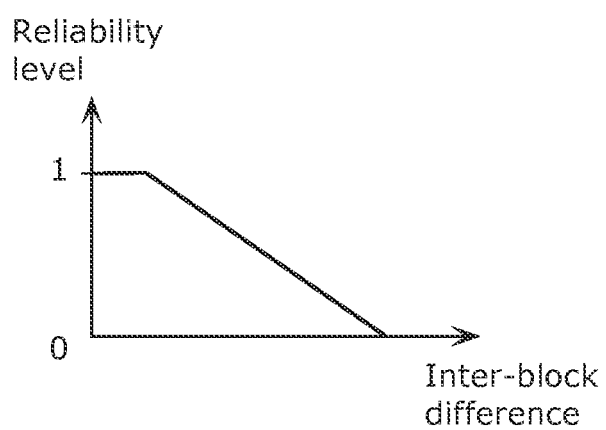
FIG. 19 shows a relationship between an inter-block difference and a reliability level according to Embodiment 3.

Here, when the difference between the target block and the corresponding block is small, it is likely that the blocks match. When the images match, the accuracy of depth estimation increases. Therefore, the reliability level calculation unit 316 calculates the reliability levels using inter-block differences 330 which are differences between the target block and the corresponding blocks during the block search. Specifically, the reliability level calculation unit 316 increases the reliability level as the inter-block difference 330 is smaller, as shown in FIG. 19. It is to be noted that the inter-block difference 330 indicates a difference between the target block and the corresponding block for the respective target blocks.

The depth estimation unit 215 performs the depth estimation processing using the image group 323 on which the position alignment has been performed. It is to be noted that the details of the depth estimation processing is the same as those in Embodiment 2, except the input image.

The reliability level calculation unit 316 calculates the reliability level information 124 using the information generated in the position alignment performed by the position alignment unit 317. Specifically, the reliability level calculation unit 316 calculates the reliability level information 124 including reliability levels of the plurality of depth values based on the minimum cost values 229 and the inter-block differences 330.

For example, when the reliability level calculated using the minimum cost value Cost(d(n)) is represented as R_cost, the reliability level calculated using the inter-block difference is represented as R_diff, and the final reliability level of the depth value is represented as R, R is represented by a function of R_cost and R_diff, as shown in Equation (2) below.

[Math 2]

$$R = f(R\_cost, R\_diff) \quad (2)$$

The final reliability level R is calculated by Equation (3) below, for example.

[Math 3]

$$R = R\_cost \times R\_diff \quad (3)$$

Although an example has been described in which the reliability level calculation unit 316 converts differences between the plurality of blocks into the reliability level information 124, the error detection unit 102A may use the inter-block differences 330 as they are. For example, the error detection unit 102A may output the inter-block differences 330 as the error amounts 126 as they are. Alternatively, the depth correction unit 103 may calculate the weights 128 using the inter-block differences 330 as they are. Specifically, the depth correction unit 103 may decrease the weight 128 as the inter-block difference 330 increases.

FIG. 20 is a flowchart showing processing performed by the image processing apparatus 300 according to the present embodiment. In the processing shown in FIG. 20, the step S301 is added to the processing shown in FIG. 15. Furthermore, the step S113B is different from the step 113A.

After the step S112, the position alignment unit 317 generates an image group 323 by performing position alignment on a plurality of images included in the input image group 223 (S301). Next, the depth estimation unit 215 generates the input depth information 121 using the input image group 323 (S201). Next, the reliability level calculation unit 316 calculates the reliability levels using the inter-block differences 330 calculated in the position alignment processing and the minimum cost values (selected cost values) 229 calculated in the depth estimation processing, and the error detection unit 102A calculates the error amounts 126 using the reliability levels calculated (S113B). It is to be noted that the subsequent processing is the same as those in Embodiments 1 and 2.

As described above, the image processing apparatus 300 according to the present embodiment uses the information obtained in the position alignment for the reliability level calculation, in addition to the information used for depth estimation. With this, the image processing apparatus 300 can calculate the reliability levels more accurately.

It is to be noted that the reliability level calculation unit 316 may calculate the final reliability levels using a scheme different from the scheme that uses Equation (3) above. For example, the reliability level calculation unit 316 may use Equation (4) below.
[Math 4]

$$R = a + R\_cost + b \times R\_diff \qquad (4)$$

Here, a and b are coefficients and $0 \leq a$ and $b \leq 1$ are satisfied.

Furthermore, although the reliability level calculation unit 316 calculates the reliability levels using both of the minimum cost values 229 and the inter-block differences 330 in the above description, the reliability levels may be calculated using only the inter-block differences 330.

The foregoing has described the image processing apparatus according to one or more embodiments of the present invention, however, the present invention is not limited to these embodiments.

For example, a part or all of the constituent elements included in the image processing apparatus in each of the above embodiments may be implemented by a single system large scale integration (System LSI). For example, the image processing apparatus 100 may be implemented by a system LSI including the feature calculation unit 101, the reliability level obtaining unit 102, and the depth correction unit 103.

The system LSI is a super multifunctional LSI manufactured by integrating a plurality of components into one chip, and specifically, a computer system that includes a microprocessor, a read only memory (ROM), a random access memory (RAM), and so forth. The ROM has a computer program recorded thereon. The System-LSI performs its functions through the microprocessor's operation according to the computer program.

The name used here is LSI, however, it may also be called IC, LSI, super LSI, or ultra LSI depending on the difference in the degree of integration. Moreover, ways to achieve integration are not limited to the LSI, and the integration may be achieved by a dedicated circuit or a general purpose processor and so forth. Also applicable is a field programmable gate array (FPGA), which allows post-manufacture programming, or a reconfigurable processor LSI, which allows post-manufacture reconfiguration of connection and setting of circuit cells therein.

In the future, with advancement in semiconductor technology or a different technology derived from the semiconductor technology, a brand-new technology may replace LSI. The functional blocks can be integrated using such a technology. The possibility is that the present invention is applied to biotechnology.

Furthermore, an aspect of the present invention is not limited to the above-described image processing apparatus but may include an image processing method including the characteristic constituent units included in the image processing apparatus as steps. Furthermore, an aspect of the present invention may include a computer program causing a computer to execute each of the characteristic steps included in the image processing method. Furthermore, an aspect of the present invention may include a non-transitory computer-readable recording medium for use in a computer having such a computer program recoded therein.

It is to be noted that in each of the above non-limiting embodiments, each constituent element may be implemented by being configured with a dedicated hardware or being executed by a software program appropriate for each constituent element. Each constituent element may be implemented by reading and executing the software program recorded in a hard disk or a recording medium such as a semiconductor memory, by a program execution unit such as a CPU or a processor. Here, the software which implements the image processing apparatus or the like in each of the above embodiments is a program described below.

Specifically, this program causes a computer to execute: calculating feature quantities of the respective pixels; obtaining reliability levels of the depth respective values; and correcting the depth values using the reliability levels and the feature quantities.

All the figures used above are provided for purposes of illustration of the present disclosure, and the present disclosure is not limited to these figures.

Furthermore, the division of the functional block in the block diagrams is just an example. The functional blocks may be realized as a single functional block, the single functional block may be divided into functional blocks, or part of the function may be moved to another functional block. Furthermore, functions of functional blocks having a function similar to one another may be processed by single hardware or software in parallel or in a time-sharing manner.

Furthermore, the order of the steps included in the image processing method is performed is shown only to exemplify the present invention specifically, and the order is not limited to the above. Furthermore, part of the above steps may be performed simultaneously (parallely) with another step.

The foregoing has described the image processing apparatus according to one or more embodiments, however, the present invention is not limited to these embodiments. Other forms in which various modifications apparent to those skilled in the art are applied to the embodiments, or forms structured by combining constituent elements of different embodiments are included within the scope of the embodiments, unless such changes and modifications depart from the scope of the present invention.

INDUSTRIAL APPLICABILITY

The present invention can be applied to an image processing apparatus. The present invention can also be applied to various electronic equipment including such an image processing apparatus, which is a digital still camera, a digital video camera, a personal computer, a tablet terminal, a mobile phone device, a smartphone, and so on.

REFERENCE SIGNS LIST 100, 200, 300 Image processing apparatus
101 Feature calculation unit
102 Reliability level obtaining unit 102A Error detection unit
103 Depth correction unit
111 Image conversion unit
112 Feature extraction unit
113 Weight calculation unit
114 Depth synthesizing unit
121 Input depth information
122 Output depth information
123 Input image
124 Reliability level information
125 Feature quantity
126 Error amount
127 Edge image
128 Weight
215 Depth estimation unit
216, 316 Reliability level calculation unit
223 Input image group
229 Minimum cost value
317 Position alignment unit
323 Image group
330 Inter-block difference

The invention claimed is:

1. An image processing apparatus which corrects depth values indicating depths of pixels included in an input image, the apparatus comprising:
a feature calculation unit configured to calculate feature quantities of the pixels;
a reliability level obtaining unit configured to obtain reliability levels of the depth values; and
a depth correction unit configured to correct the depth values using the reliability levels and the feature quantities, and output corrected depth values for an output image,
wherein the correction of the depth values includes correcting a depth value of a target pixel to be processed, by preferentially using a depth value whose reliability level is high and a depth value whose feature quantity is close to a feature quantity of the depth value of the target pixel, among depth values of reference pixels included in the pixels.

2. The image processing apparatus according to claim 1, wherein the depth correction unit includes:
a weight calculation unit configured to calculate weights of the reference pixels using the feature quantities and the reliability levels of the reference pixels; and
a depth synthesizing unit configured to generate the depth value of the corrected target pixel by weighted averaging the depth values of the reference pixels using the weights calculated.

3. The image processing apparatus according to claim 2, wherein the weight calculation unit is configured to: calculate differences between the feature quantity of the target pixel and the feature quantities of the reference pixels;
and reduce the weight of a corresponding one of the reference pixels as the difference increases.

4. The image processing apparatus according to claim 2, wherein the weight calculation unit is configured to increase the weight of a corresponding one of the reference pixels as the reliability level of the reference pixel increases.

5. The image processing apparatus according to claim 2, wherein the weight calculation unit is configured to reduce the weight of a corresponding one of the reference pixels as a distance of the reference pixel from the target pixel increases.

6. The image processing apparatus according to claim 1, wherein the feature quantities include edge strengths of the pixels.

7. The image processing apparatus according to claim 1, wherein the feature quantities include edge directions of the pixels.

8. The image processing apparatus according to claim 1, wherein the reliability level indicates one of correctness levels of the depth values and whether or not the depth values are correct.

9. The image processing apparatus according to claim 1, further comprising
a depth estimation unit configured to estimate the depth values using a plurality of images including the input image.

10. The image processing apparatus according to claim 9, wherein the depth estimation unit is configured to: calculate, for the pixels, cost values indicating matching levels between (i) a blur amount of the target pixel to be processed and (ii) a plurality of predetermined blur amounts that corresponds to a plurality of predetermined depths, the cost values being calculated for the depth values; and estimate, as the depth value of the target pixel, a depth value that corresponds to a selected cost value that indicates a highest matching level among the calculated cost values, and
the reliability level obtaining unit is configured to calculate the reliability level using the selected cost value.

11. The image processing apparatus according to claim 10,
wherein the reliability level obtaining unit is configured to increase the reliability level as the matching level indicated by the selected cost value increases.

12. The image processing apparatus according to claim 11,
wherein the reliability level obtaining unit is further configured to set the reliability level to a lowest value when the matching level indicated by the selected cost value is smaller than a threshold.

13. The image processing apparatus according to claim 12,
wherein the reliability level obtaining unit is further configured to change the threshold according to a luminance value of the target pixel.

14. The image processing apparatus according to claim 13,
wherein the reliability level obtaining unit is configured to increase the threshold as the luminance value is greater.

15. The image processing apparatus according to claim 9, further comprising
a position alignment unit configured to move a position of an object to align the position of the object in the images,
wherein the depth estimation unit is configured to estimate the depth values using the images on which the position alignment has been performed, and
the reliability level obtaining unit is configured to calculate the reliability level using information generated in the position alignment.

16. The image processing apparatus according to claim 15,
wherein, in the position alignment, the position alignment unit is configured to: calculate differences between a target block included in a target image which is one of the images and a plurality of blocks included in an image different from the target image among the images; and determine a block that has a smallest difference among the calculated differences as a corresponding block that corresponds to the target block, and
the reliability level obtaining unit is configured to increase the reliability level as the difference between the target block and the corresponding block is smaller.

17. An image processing method of correcting depth values indicating depths of pixels included in an input image, the image processing method comprising:
calculating feature quantities of the pixels;
obtaining reliability levels of the depth values;
correcting the depth values using the reliability levels and the feature quantities; and
outputting corrected depth values for an output image,
wherein the correcting the depth values includes correcting a depth value of a target pixel to be processed, by preferentially using a depth value whose reliability level is high and a depth value whose feature quantity is close to a feature quantity of the depth value of the target pixel, among depth values of reference pixels included in the pixels.

18. A non-transitory computer-readable recording medium for use in a computer, the recording medium having a computer program recorded thereon for causing the computer to execute the image processing method according to claim 17.

19. An integrated circuit which corrects depth values indicating depths of pixels included in an input image, the integrated circuit comprising:
a feature calculation unit configured to calculate feature quantities of the pixels;
a reliability level obtaining unit configured to obtain reliability levels of the depth values; and
a depth correction unit configured to correct the depth values using the reliability levels and the feature quantities, and output corrected depth values for an output image,
wherein the correction of the depth values includes correcting a depth value of a target pixel to be processed, by preferentially using a depth value whose reliability level is high and a depth value whose feature quantity is close to a feature quantity of the depth value of the target pixel, among depth values of reference pixels included in the pixels.

* * * * *